(12) United States Patent
Deane (10) Patent No.: US 7,506,624 B2
(45) Date of Patent: Mar. 24, 2009

(54) VARIABLE ENGINE VALVE ACTUATION SYSTEM

(75) Inventor: Daniel Deane, Bretton Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 256 days.

(21) Appl. No.: 11/363,258

(22) Filed: Feb. 28, 2006

(65) Prior Publication Data

US 2007/0199529 A1    Aug. 30, 2007

(51) Int. Cl.
 *F01L 1/18* (2006.01)
(52) U.S. Cl. .............. 123/90.39; 123/90.44; 123/90.48; 123/90.6; 74/569
(58) Field of Classification Search ............. 123/90.16, 123/90.2, 90.39, 90.44, 90.6, 90.27, 90.31, 123/90.48, 90.5, 90.52; 74/559, 567, 569
See application file for complete search history.

(56) References Cited

U.S. PATENT DOCUMENTS

| | | | |
|---|---|---|---|
| 2,663,288 A | 12/1953 | Hutchison | |
| 3,590,796 A | 7/1971 | Harkness et al. | |
| 4,204,814 A | 5/1980 | Matzen | |
| 4,353,334 A | 10/1982 | Neitz | |
| 4,741,297 A | 5/1988 | Nagahiro et al. | |
| 4,768,475 A | 9/1988 | Ikemura | |
| 4,788,946 A | 12/1988 | Inoue et al. | |
| 5,090,364 A | 2/1992 | McCarroll et al. | |
| 5,203,289 A * | 4/1993 | Hara et al. | 123/90.16 |
| 5,419,290 A * | 5/1995 | Hurr et al. | 123/90.16 |
| 6,481,398 B2 | 11/2002 | Uchiyama | |
| 6,772,742 B2 | 8/2004 | Lei et al. | |
| 6,848,402 B2 * | 2/2005 | Kreuter | 123/90.16 |
| 6,854,435 B2 | 2/2005 | Williams | |
| 6,895,912 B2 | 5/2005 | Saruwatari et al. | |
| 2005/0183685 A1 | 8/2005 | Kieninger et al. | |

FOREIGN PATENT DOCUMENTS

| | | |
|---|---|---|
| DE | 4200510 | 7/1993 |
| DE | 4244286 | 7/1994 |
| DE | 4338473 | 5/1995 |
| DE | 19505725 | 8/1996 |
| EP | 0292185 | 11/1988 |
| WO | WO 85/03737 | 8/1985 |
| WO | 97/39222 | 10/1997 |

* cited by examiner

*Primary Examiner*—Ching Chang
(74) *Attorney, Agent, or Firm*—Finnegan, Henderson, Farabow, Garrett & Dunner (57) ABSTRACT

A valve actuation system for a power system is provided. The valve actuation system has an engine valve moveable to selectively prevent or allow a flow of fluid relative to the engine valve. The valve actuation system also has a cam assembly with a first cam lobe and a second cam lobe. The valve actuation system also has a cam follower with a first tappet protrusion and a second tappet protrusion. A selective rotation of the cam follower engages either the first tappet protrusion with the first cam lobe to move the engine valve through a first valve event, or the second tappet protrusion with the second cam lobe to move the engine valve through a second valve event.

31 Claims, 10 Drawing Sheets

VARIABLE ENGINE VALVE ACTUATION SYSTEM

TECHNICAL FIELD

The present invention is directed to a system and method for actuating an engine valve and, more particularly, to a variable engine valve actuation system.

BACKGROUND

The operation of an internal combustion engine such as, for example, a diesel, gasoline, or gaseous fuel-powered engine, may cause the generation of undesirable emissions. These emissions, which may include particulates and oxides of nitrogen (NOx), are generated when fuel is combusted in a combustion chamber of the engine. An exhaust stroke of the engine piston forces exhaust gas, which may include these emissions, from the combustion chamber to the atmosphere.

Due to increased attention on the environment, exhaust emission standards have become more stringent and the amount of emissions emitted from an engine to the atmosphere may be regulated depending on the type of engine, size of engine, and/or class of engine. One method implemented by engine manufacturers to comply with the regulation of exhaust emissions is described in U.S. Pat. No. 4,768,475 (the '475 patent) issued to Ikemura on Sep. 16, 1988. The '475 patent describes varying the typically fixed valve timing of an engine in order to improve the combustion process. Specifically, the '475 patent discloses a valve mechanism having a first cam and a second cam. Each of the first and second cams has a common base circle, but the lobe lift amounts and opening/closing angles are different. A first rocker arm engages the first cam, and a second rocker arm engages the second cam. The rocker arms have holes, which three pins engage to selectively connect the first and second rocker arms with an actuating arm so as to be rocked together with the actuating arm. During a low engine speed condition, the pins are moved to engage the first rocker arm with the actuating arm. During a high engine speed condition, the pins are moved to engage the second rocker arm with the actuating arm. In this manner, the first cam having a low valve lift and a small opening angle is selected to control motion of an intake valve during low engine speeds, and the second cam having a high valve lift and a large opening angle is selected to control motion of the intake valve during high engine speeds.

Although the valve mechanisms of the '475 patent may improve the combustion process by providing variable valve timing, it may be limited. In particular, because the '475 patent only provides two levels of valve actuation (e.g., two fixed valve lifts and two fixed opening/closing angles), it may not allow efficient combustion throughout the range of engine operation. In addition, because the valve mechanism of the '475 patent is only associated with the intake valve, some emission reducing methods such as, for example, internal exhaust gas recirculation, may be not be possible.

The engine valve actuation system and method of the present invention solves one or more of the problems set forth above.

SUMMARY OF THE INVENTION

In one aspect, the present disclosure is directed to a valve actuation system having an engine valve moveable to selectively prevent or allow a flow of fluid relative to the engine valve. The valve actuation system includes a cam assembly with a first cam lobe and a second cam lobe. The valve actuation system also includes a cam follower with a first tappet protrusion and a second tappet protrusion. A selective rotation of the cam follower engages either the first tappet protrusion with the first cam lobe to move the engine valve through a first valve event, or the second tappet protrusion with the second cam lobe to move the engine valve through a second valve event.

In another aspect, the present invention is directed to a method of actuating an engine valve to selectively prevent and allow a flow of fluid relative to the engine valve. The method includes rotating a cam assembly having a first cam lobe and a second cam lobe. The method also includes rotating a cam follower to selectively engage either a first tappet protrusion with the first cam lobe to move the engine valve through a first valve event, or a second tappet protrusion with the second cam lobe to move the engine valve through a second valve event.

DETAILED DESCRIPTION

Figure 1:
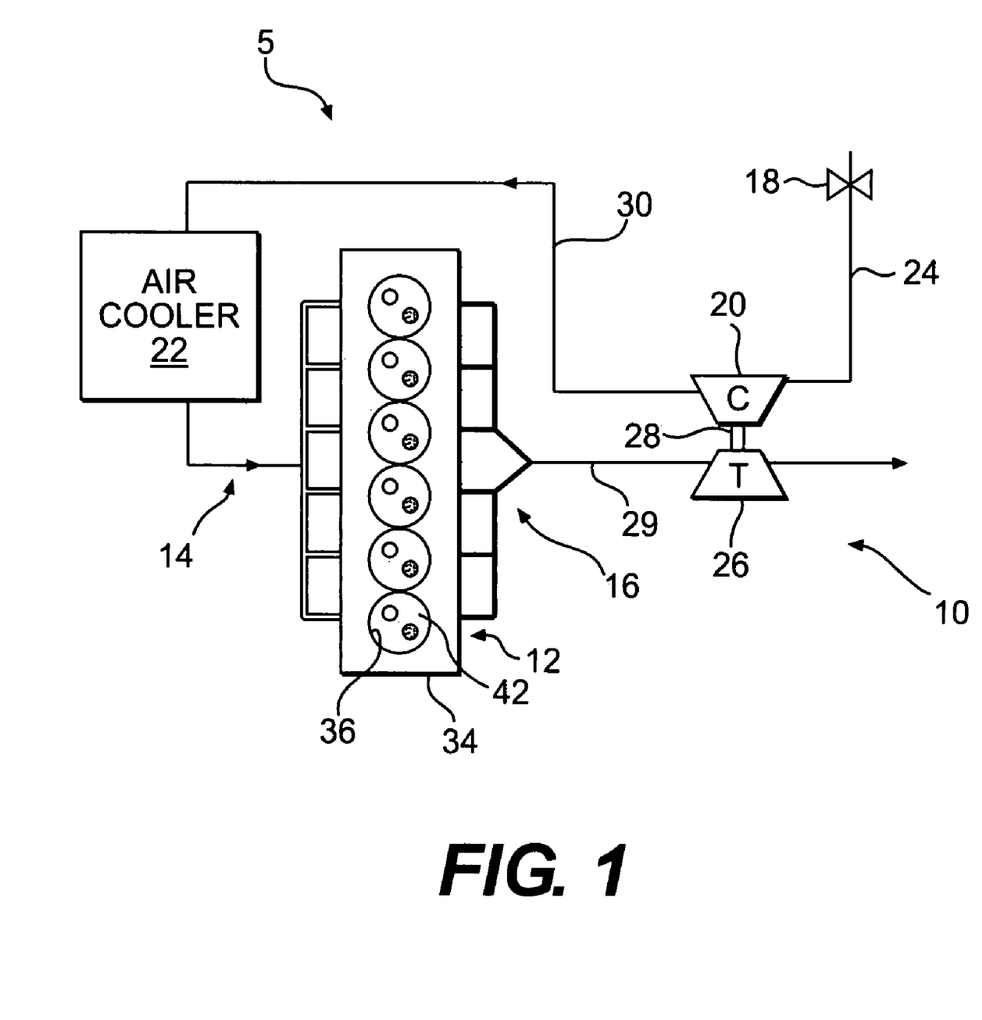
FIG. 1 is a schematic illustration of an exemplary disclosed power system.

FIG. 1 illustrates a power system 5 having a fluid handling system 10 configured to direct compressed air to and exhaust gases from a power source 12. Fluid handling system 10 may include an air induction system 14 and an exhaust system 16.

It is contemplated that fluid handling system 10 may include additional subsystems such as, for example, an exhaust aftertreatment system, an external exhaust gas recirculation system, and other systems known in the art.

Air induction system 14 may include components configured to introduce charged air into power source 12. For example, air induction system 14 may include an induction valve 18, one or more compressors 20, and an air cooler 22. It is contemplated that additional components may be included within air induction system 14 such as, for example, additional valving, one or more air cleaners, one or more waste gates, a control system, and other means for introducing charged air into power source 12. It is also contemplated that power source 12 may alternatively be naturally aspirated rather than turbocharged, if desired.

Induction valve 18 may be fluidly connected to compressors 20 via a fluid passageway 24 and configured to regulate the flow of atmospheric air to power source 12. Induction valve 18 may embody a shutter valve, a butterfly valve, a diaphragm valve, a gate valve, or any other type of valve known in the art. Induction valve 18 may be solenoid-actuated, hydraulically-actuated, pneumatically-actuated, or actuated in any other manner in response to one or more predetermined conditions.

Compressor 20 may be configured to compress the air flowing into power source 12 to a predetermined pressure level. Compressors 20, if more than one is included within air induction system 14, may be disposed in a series or parallel relationship and fluidly connected to power source 12 via a fluid passageway 30. Compressor 20 may embody a fixed geometry compressor, a variable geometry compressor, or any other type of compressor known in the art. It is contemplated that compressed air may be diverted from fluid passageway 30 for other uses, if desired.

Air cooler 22, if used, may embody an air-to-air heat exchanger, an air-to-liquid heat exchanger, or a combination of both, and be configured to facilitate the transfer of thermal energy to or from the air directed into power source 12. For example, air cooler 22 may include a shell and tube-type heat exchanger, a corrugated plate-type heat exchanger, a tube and fin-type heat exchanger, or any other type of heat exchanger known in the art. Air cooler 22 may be disposed with fluid passageway 30, between compressor 20 and power source 12.

Exhaust system 16 may include a means for directing exhaust flow out of power source 12. For example, exhaust system 16 may include one or more turbines 26 connected in a series or parallel relationship. It is contemplated that exhaust system 16 may include additional components such as, for example, particulate traps, NOx absorbers or other catalytic devices, attenuation devices, and other means for directing exhaust flow out of power source 12 that are known in the art.

Each turbine 26 may be connected to one or more compressor 20 of air induction system 14 by way of a common shaft 28 and configured to drive the connected compressor 20. In particular, as the hot exhaust gases exiting power source 12 move through an exhaust passageway 29 to turbine 26 and expand against blades (not shown) of turbine 26, turbine 26 may rotate and drive the connected compressor 20. It is also contemplated that turbine 26 may be omitted and compressor 20 driven by power source 12 mechanically, hydraulically, electrically, or in any other manner known in the art, if desired.

Figures 2, 3:
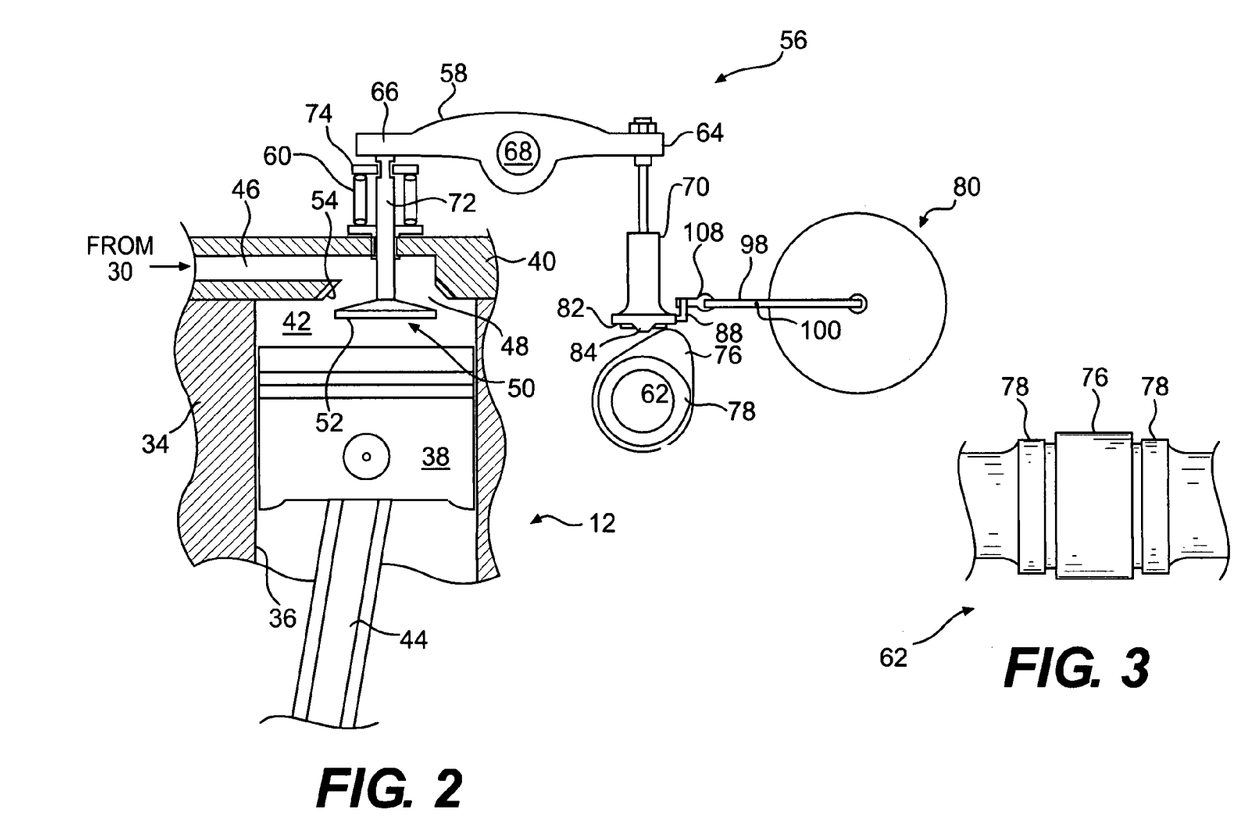
FIG. 2 is a side view diagrammatic and cross sectional illustration of an exemplary disclosed engine valve actuation system for use with the power system of FIG. 1.
FIG. 3 is a pictorial illustration of an exemplary disclosed cam for use with the engine valve actuation system of FIG. 2.

For the purposes of this disclosure, power source 12 is depicted and described as a four-stroke diesel engine. One skilled in the art will recognize, however, that power source 12 may be any other type of internal combustion engine such as, for example, a gasoline or a gaseous fuel-powered engine. Power source 12 may include an engine block 34 that defines a plurality of cylinders 36 (one of which is illustrated in FIG. 2). As illustrated in FIG. 2, a piston 38 may be slidably disposed within each cylinder 36 to reciprocate between a top-dead-center position and a bottom-dead-center position, and a cylinder head 40 may be associated with each cylinder 36.

Cylinder 36, piston 38, and cylinder head 40 may form a combustion chamber 42. In the illustrated embodiment, power source 12 includes six combustion chambers 42 (referring to FIG. 1). However, it is contemplated that power source 12 may include a greater or lesser number of combustion chambers 42 and that combustion chambers 42 may be disposed in an "in-line" configuration, a "V" configuration, or in any other suitable configuration.

Power source 12 may also include a crankshaft (not shown) that is rotatably disposed within engine block 34. A connecting rod 44 may connect each piston 38 to the crankshaft so that a sliding motion of piston 38 between the top-dead-center and bottom-dead-center positions within each respective cylinder 36 results in a rotation of the crankshaft. Similarly, a rotation of the crankshaft may result in a sliding motion of piston 38 between the top-dead-center and bottom-dead-center positions. In a four-stroke diesel engine, piston 38 may reciprocate between the top-dead-center and bottom-dead-center positions through an intake stroke, a compression stroke, a combustion or power stroke, and an exhaust stroke.

Cylinder head 40 may define an intake passageway 46 and an exhaust passageway (not shown). Intake passageway 46 may direct compressed air from fluid passageway 30, through an intake opening 48, and into combustion chamber 42. The exhaust passageway may direct exhaust gases from combustion chamber 42 to exhaust passageway 29.

An intake valve 50 having a valve element 52 may be disposed within intake opening 48 and configured to selectively engage a seat 54. Specifically, valve element 52 may be movable between a first position at which valve element 52 engages seat 54 to prevent a flow of fluid relative to intake opening 48, and a second position at which valve element 52 is removed from seat 54 to allow a flow of fluid relative to intake opening 48.

A series of valve actuation assemblies 56 (one of which is illustrated in FIG. 2) may be operatively engaged with power source 12 to move valve element 52 between the first and second positions. Another valve actuation assembly 56 may be provided to move an exhaust valve element (not shown) between the first and second positions, if desired. It should be noted that each cylinder head 40 could include multiple intake openings 48 and multiple exhaust openings (not shown). Each such opening would have an associated valve element 52. Power source 12 may include a valve actuation assembly 56 for each cylinder head 40 that is configured to actuate all of the intake valves 50 or all of the exhaust valves of that cylinder head 40. It is also contemplated that a single valve actuation assembly 56 could actuate the intake valves 50 associated with multiple cylinder heads 40, if desired. Each valve actuation assembly 56 may include a rocker arm 58, a valve spring 60, a common cam assembly 62, a cam follower 70, and an actuating device 80.

Rocker arm 58 may be configured to move valve element 52 between the first and second positions. Specifically, rocker arm 58 may include a first end 64, a second end 66, and a pivot point 68. First end 64 of rocker arm 58 may be operatively engaged with cam follower 70, while second end 66 may be operatively engaged with valve element 52 through a valve stem 72. A rotation of rocker arm 58 about pivot point 68 may cause valve element 52 to move from the first position to the second position.

Valve spring 60 may act on valve stem 72 through a locking nut 74. In particular, valve spring 60 may bias valve element 52 into the first position, where valve element 52 engages seat 54 to prevent a flow of fluid relative to intake opening 48.

Cam assembly 62 may be operatively engaged with the crankshaft of power source 12 in any manner readily apparent to one skilled in the art where a rotation of the crankshaft will result in a corresponding rotation of cam assembly 62. For example, cam assembly 62 may be connected to the crankshaft through a gear train (not shown) that reduces the rotational speed of cam assembly 62 to approximately one half of the rotational speed of the crankshaft. As illustrated in FIG. 3, cam assembly 62 may include a primary cam lobe 76 and a pair of opposing secondary cam lobes 78. As will be explained in greater detail below, the shape of primary cam lobe 76 may determine, at least in part, the actuation timing and lift of valve element 52 during a first operation of power source 12. In contrast, secondary cam lobes 78 may determine, at least in part, the actuation timing and lift of valve element 52 during a second operation of power source 12.

Figure 4:
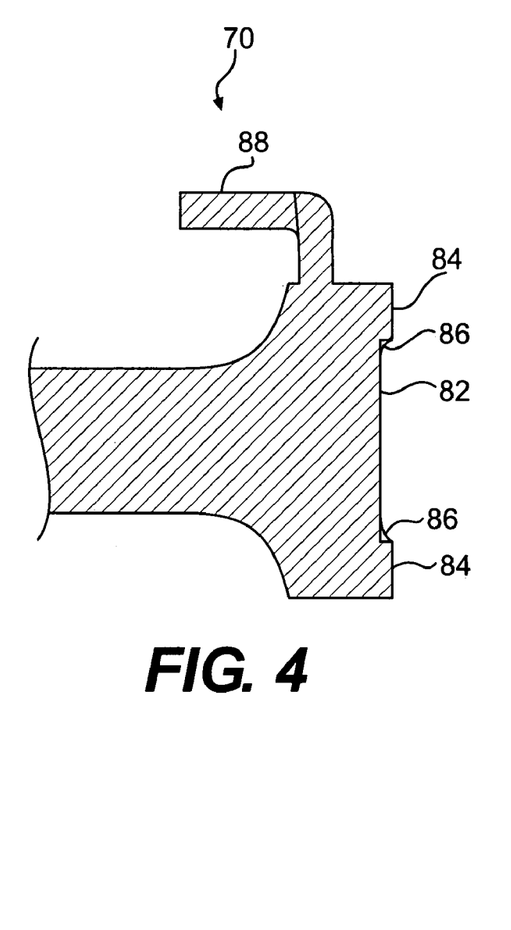
FIG. 4 is a cross sectional illustration of an exemplary disclosed cam follower for use with the engine valve actuation system of FIG. 2.

Cam follower 70 may be adapted to follow the profiles of cam assembly 62 as it rotates, and transfer a corresponding reciprocating motion to rocker arm 58. In particular, cam follower 70 may extend from cam assembly 62 to first end 64 of rocker arm 58 and, as illustrated in the cross section of FIG. 4, may include at least one primary tappet protrusion 82 and at least one secondary tappet protrusion 84. Primary tappet protrusion 82 may engage and follow the profile of primary cam lobe 76, while secondary tappet protrusion 84 may extend past primary tappet protrusion 82 to engage and follow the profile of secondary cam lobes 78. As cam assembly 62 rotates, the profile of primary and secondary cam lobes 76, 78 may cause cam follower 70 to rise and lower, thereby producing a pivoting motion of rocker arm 58 about pivot point 68. Thus, the rotation of cam assembly 62 may cause valve element 52 to move from the first position to the second position to create at least two different lift patterns, one associated with primary cam lobe 76, and one associated with secondary cam lobe 78. The distance that secondary tappet protrusion 84 extends past primary tappet protrusion 82 may affect the lift of valve element 52 away from seat 54. It is contemplated that a push rod (not shown) may be associated with cam follower 70, if desired, and disposed between cam follower 70 and rocker arm 58.

Figure 5:
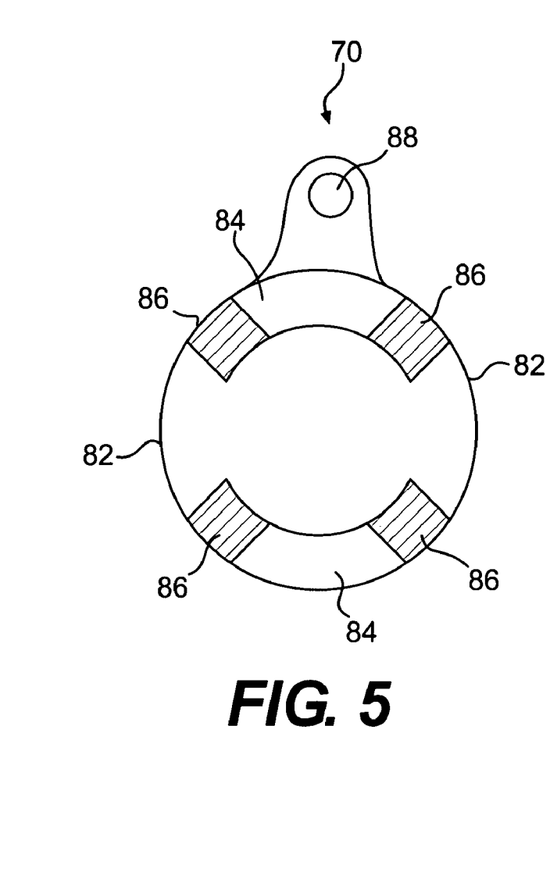
FIG. 5 is an end view pictorial illustration of the cam follower of FIG. 4.

As illustrated in FIG. 5, primary and secondary tappet protrusions 82, 84 may be equally spaced apart around the periphery of cam follower 70. That is, primary tappet protrusion 82 may be spaced approximately orthogonal to secondary tappet protrusion 84. A sloping transition area 86 may join primary and secondary tappet protrusions 82, 84. In this manner, cam follower 70, when in a first position may engage primary tappet protrusion 82 with primary cam lobe 76 and, when rotated through an angle (e.g., of approximately 90 degrees) to a second position, may engage secondary tappet protrusion 84 with secondary cam lobes 78. The rotation timing may affect the opening and closing timing of valve element 52. A rotation lever arm 88 may facilitate the rotation of cam follower 70 from the first to the second positions, as will be described in more detail below.

Actuating device 80 may be an assembly of components configured to engage rotation lever arm 88 and cause movement of cam follower 70 from the first to the second positions. In one embodiment, actuating device 80 may include an actuator 90 connected to rotation lever arm 88 by way of a linkage system 92.

Figure 6:
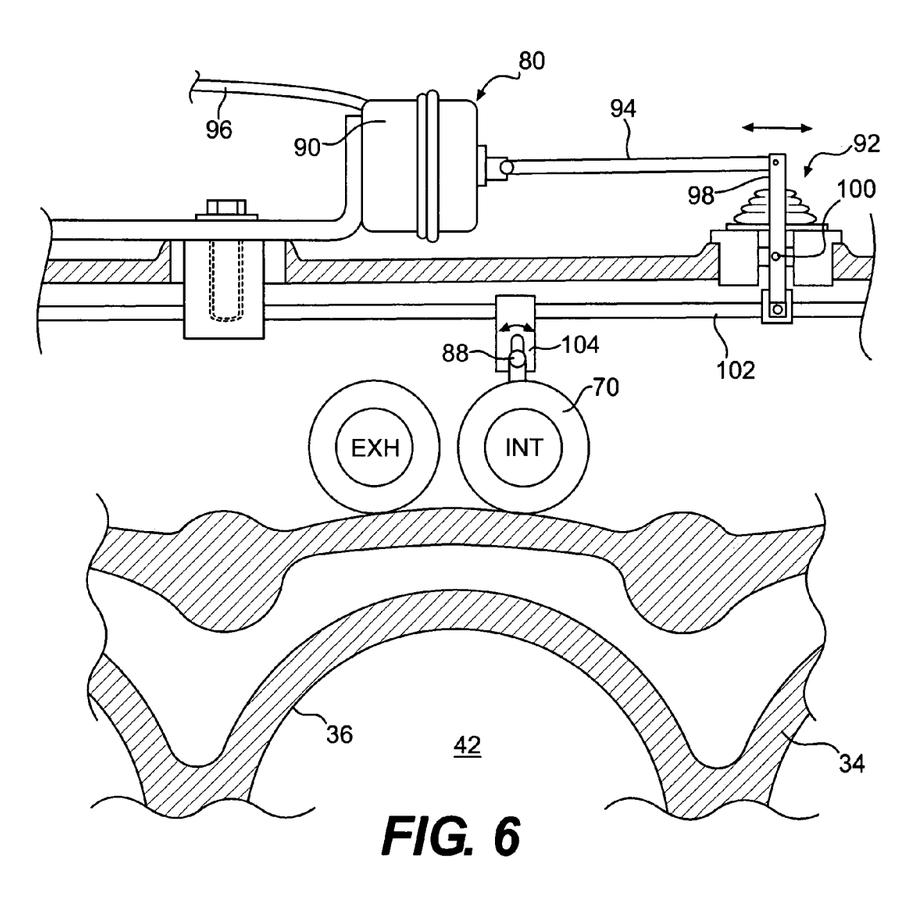
FIG. 6 is a top view diagrammatic and cross sectional illustration of engine valve actuation system of FIG. 2.

Actuator 90 may be pneumatically operated to initiate movement of valve element 52 via linkage system 92 and cam follower 70. Specifically, actuator 90 may include a spring-biased piston member (not shown) disposed within a pressure chamber and fixedly connected to a piston rod 94. Pressurized air directed into the pressure chamber via an inlet 96 may urge the spring-biased piston member from a first position away from the pressure chamber to a second position. Conversely, allowing the pressurized air to drain from the pressure chamber may return the spring-biased piston member to the first position. As piston rod 94 translates between the first and second positions, a connected linkage member 98 may pivot about a pivot point 100. The pivoting of linkage member 98 may result in a translating motion of a connected linkage member 102. Linkage member 102 may be connected to rotation lever arm 88 by way of a coupling 104, such that a translation of linkage member 102 results in a rotation cam follower 70. In this manner, a translation of piston rod 94 from the first to the second positions may result in either primary tappet protrusion 82 being engaged to follow the profile of primary cam lobe 76, or secondary tappet protrusion 84 being engaged to follow the profile of secondary cam lobe 78. It is contemplated that actuator 90 may alternatively be mechanically operated, hydraulically operated, electrically operated, or operated in any other suitable manner such that cam follower 70 is selectively rotated through an angle (e.g. about 90 degrees), from the first to the second position. It is contemplated that cam follower may be rotated to any position between the first and second positions to, thereby, provide more than two levels of actuation, if desired.

Figure 7:
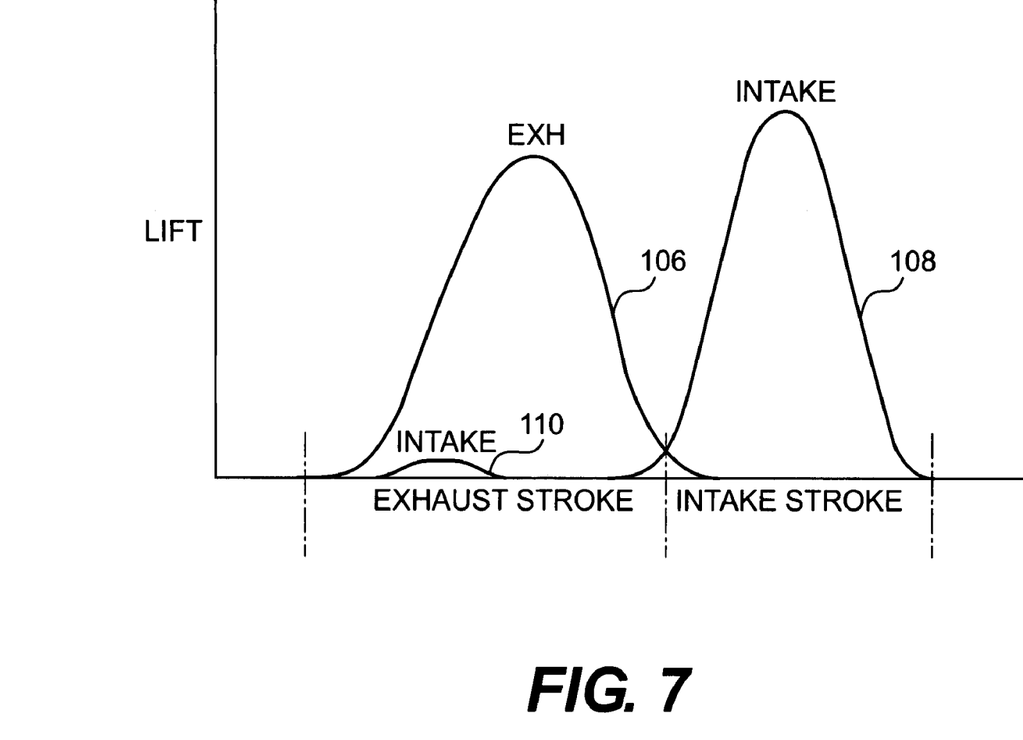
FIG. 7 is a graph illustrating the operation of the engine valve actuation system of FIG. 2.

FIG. 7 illustrates a graph showing examples of some of the different valve events possible with power system 5. Specifically, the graph shows a first curve 106 representing a first operation of an exhaust valve, a second curve 108 representing a first operation of intake valve 50, and a third curve 110 representing a second operation of intake valve 50. As depicted by first curve 106, during an exhaust stroke of piston 38, when piston 38 is traveling from the bottom-dead-center position to the top-dead-center position to push exhaust gases from combustion chamber 42, the exhaust valve may open to direct the gases to the atmosphere via exhaust passageway 29. As depicted by second curve 108, during an intake stroke, when piston 38 is traveling from the top-dead-center position to the bottom-dead-center position, valve element 52 may be moved away from seat 54 to draw fresh air and fuel into combustion chamber 42. As depicted by third curve 110, during a non-conventional exhaust stroke, cam follower 70 may be rotated such that secondary tappet protrusions 84 engage secondary cam lobes 78 and cause valve element 52 to move away from seat 54. In this situation, some of the exhaust gases being pushed from combustion chamber 42 may be pushed in reverse direction into fluid passageway 30. During the ensuing intake stroke, in addition to fresh intake air, some exhaust gas is drawn back into combustion chamber 42 for subsequent combustion. The recirculated exhaust gases may dilute the concentration of oxygen in the combustion chamber, resulting in a lower temperature combustion. The lower temperature combustion may in turn lower the production of NOx. It is contemplated that power system 5 may alternatively or additionally implement other variable valve timing events such as, for example, engine braking, early or late closing events such as the Miller Cycle, and other variable valve timing events known in the art, if desired.

Figure 8:
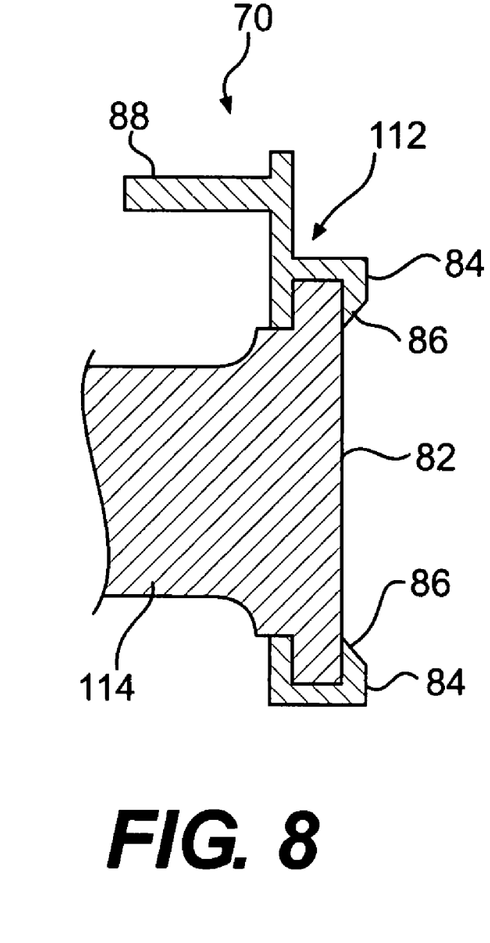
FIG. 8 is a cross sectional illustration of an alternative cam follower for use with the engine valve actuation system of FIG. 2.

FIG. 8 illustrates an alternatively embodiment of cam follower 70. Similar to cam follower 70 of FIG. 4, cam follower 70 of FIG. 8 includes primary tappet protrusion 82, secondary tappet protrusion 84, transition areas 86, and rotation lever arm 88. However, in contrast to FIG. 4, secondary tappet protrusion 84, transition areas 86, and rotation lever arm 88 may be included in an integral component 112 that is separate from a main portion 114 having primary tappet protrusion 82. In the embodiment of FIG. 8, integral component 112 may be rotated to selectively engage secondary tappet protrusions 84 with secondary cam lobes 78, without imparting rotation to main portion 114.

Figure 9:
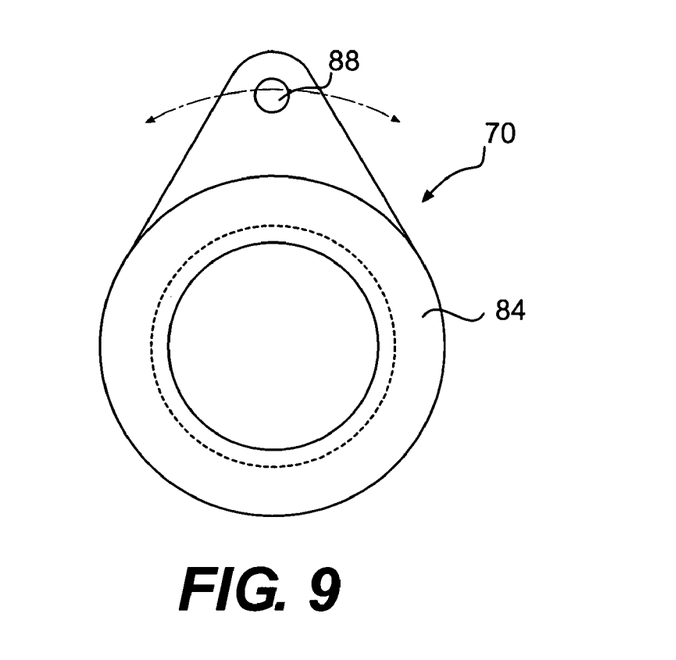
FIG. 9 is an end view pictorial illustration of another alternative cam follower for use with the engine valve actuation system of FIG. 2.
Figure 10:
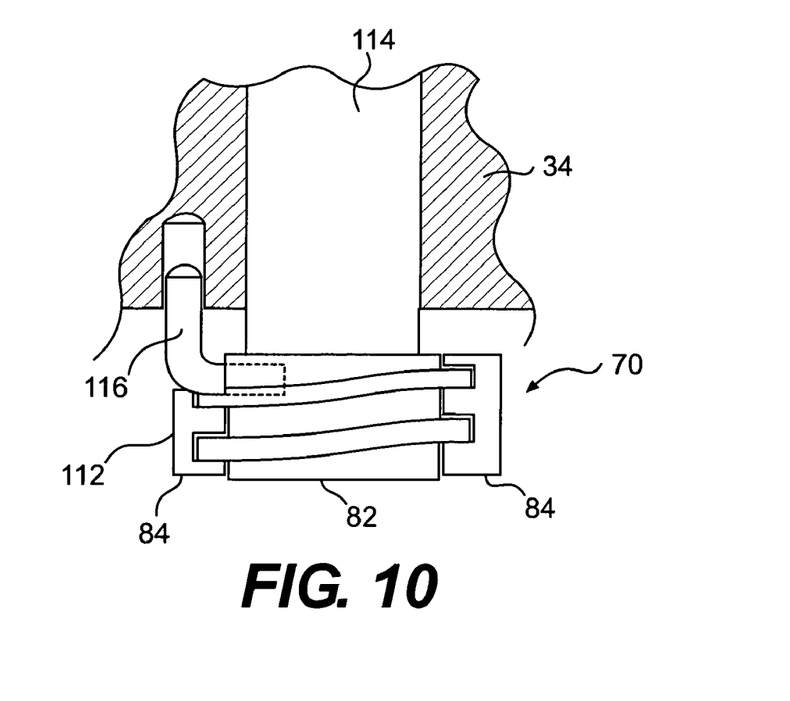
FIG. 10 is a cross sectional illustration of the cam follower of FIG. 9.

FIGS. 9 and 10 illustrate an additional alternative embodiment of cam follower 70. Similar to cam follower 70 of FIG. 8, cam follower 70 of FIGS. 9 and 10 include integral component 112 separate from main portion 114. However, in contrast to FIG. 8, primary tappet protrusion 82 of FIGS. 9 and 10 may be centrally located, with secondary tappet protrusion 84 being formed in a continuous annular surface surrounding primary tappet protrusion 82. In addition, secondary tappet protrusion 84 may be lowered into engagement with secondary cam lobes 78 through the rotating motion of lever arm 88. Specifically, integral component 112 may be threadedly connected to main portion 114 and configured to axially translate with respect to main portion 114 as rotation arm lever 88 is moved by actuating device 80. A locking arm 116 may be fixedly connected to main portion 114 and slidably connected with engine block 34 or other suitable structural member of power source 12 such that main portion 114 remains rotationally fixed during the rotation and subsequent translation of integral component 112. In this embodiment, the amount of rotation of locking arm 116 may determine, at least in part, the axial translation of integral component 112 and corresponding lift of valve element 52.

Figure 11:
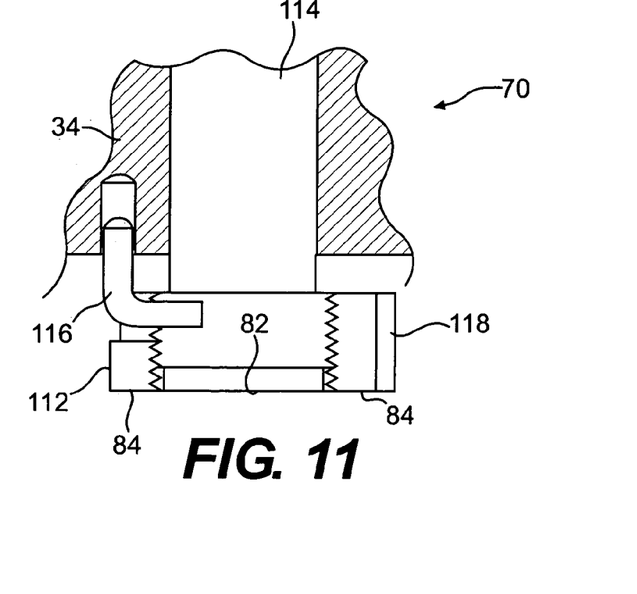
FIG. 11 is a cross sectional illustration of another alternative cam follower for use with the engine valve actuation system of FIG. 2.
Figure 12A:
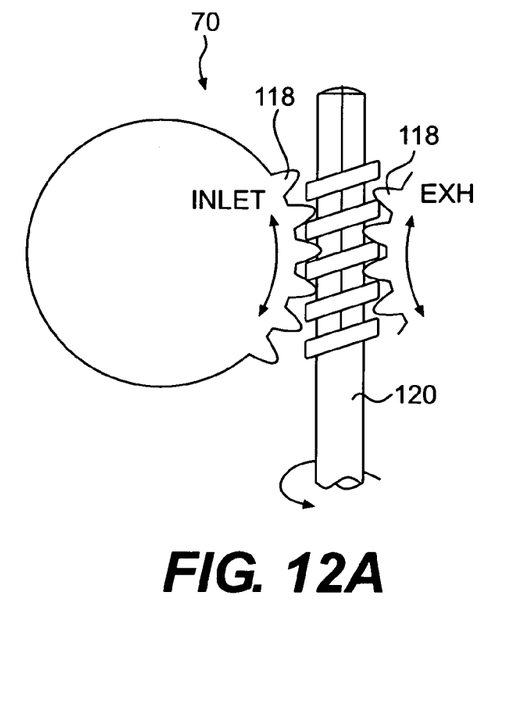
FIG. 12A is an end view pictorial illustration of the cam follower of FIG. 11.
Figure 12B:
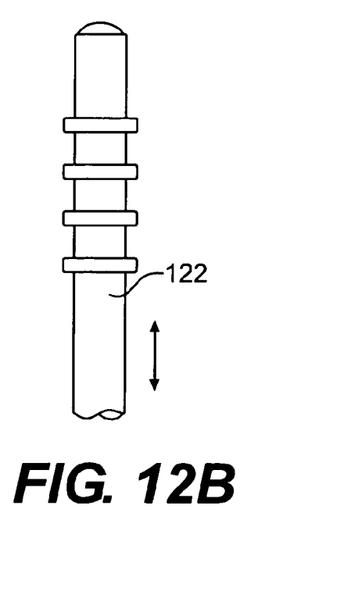
FIG. 12B is another end view pictorial illustration of the cam follower of FIG. 11, but with an alternative actuator.

FIGS. 11, 12A, and 12B illustrate an additional alternative embodiment of cam follower 70. Similar to cam follower 70 of FIGS. 9 and 10, cam follower 70 of FIGS. 11, 12A, and 12B may include integral component 112 separate from, but threadedly connected to main portion 114, and locking arm 116. However, in contrast to FIGS. 9 and 10, cam follower 70 of FIGS. 11, 12A, and 12B may include external gear teeth 118 in place of rotation arm lever 88. External gear teeth 118 may be engaged and rotated by either a rotating worm gear mechanism 120 (referring to FIG. 12A) or a translating rack mechanism 122 (referring to FIG. 12B). As illustrated in FIG. 12A, it is contemplated that both an intake cam follower 70 and an exhaust cam follower 70 may be actuated by the same rotating worm gear or rack mechanism 120, 122, if desired. A rotary style actuator (not shown) may be utilized to drive worm gear mechanism 120 of FIG. 12A, while actuator 90 may be used to provide the driving translation of rack mechanism 122.

Figure 13:
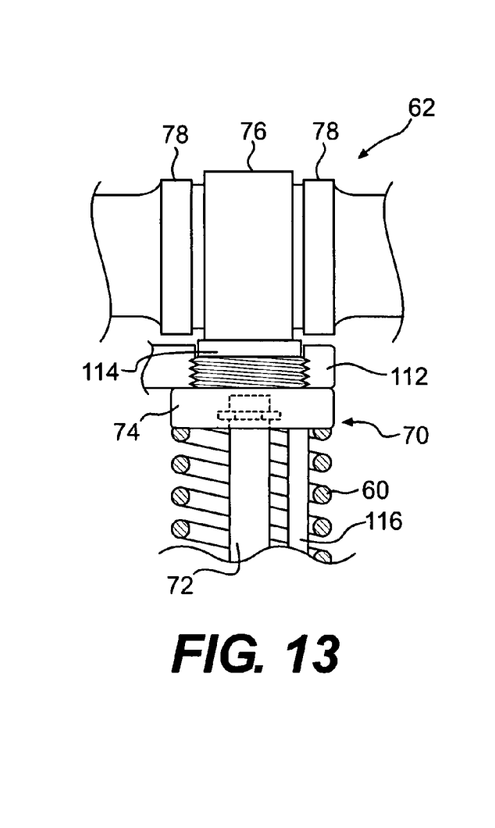
FIG. 13 is a side view pictorial illustration of another alternative cam follower for use with the engine valve actuation system of FIG. 2.
Figure 14:
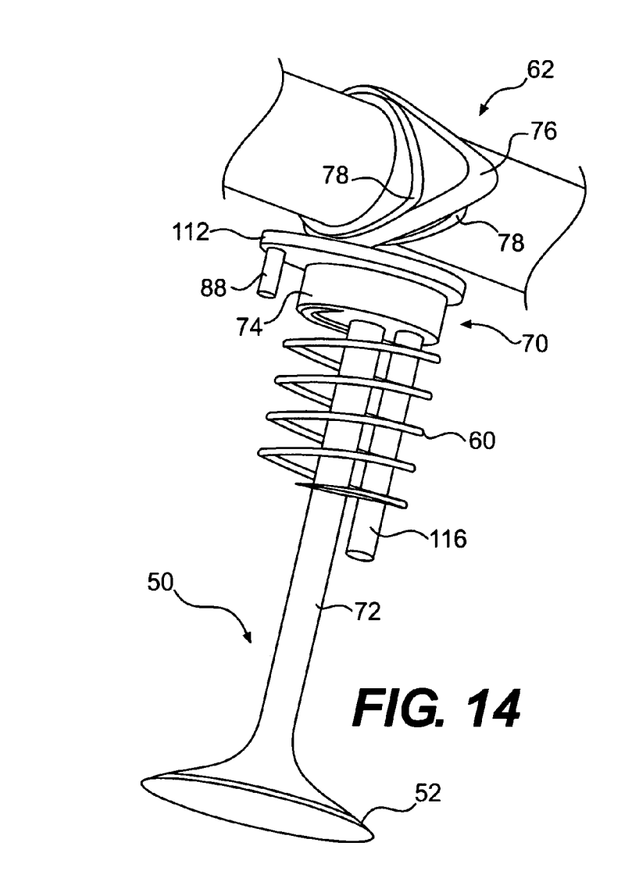
FIG. 14 is an oblique view pictorial illustration of the cam follower of FIG. 14.

FIGS. 13 and 14 illustrate an additional alternative embodiment of cam follower 70. Similar to cam follower 70 of FIGS. 9 and 10, cam follower 70 of FIGS. 13 and 14 may include integral component 112 having secondary tappet protrusion 84, and rotation lever arm 88 separate from, but threadedly connected to main portion 114, and locking arm 116. However, in contrast to cam follower 70 of FIGS. 9 and 10, cam follower 70 of FIGS. 13 and 14 may be designed for use with an over-head cam engine. In particular, rather than cam follower 70 acting through rocker arm 58, cam follower 70 of FIGS. 13 and 14 may act directly on intake valve 50.

Figure 15:
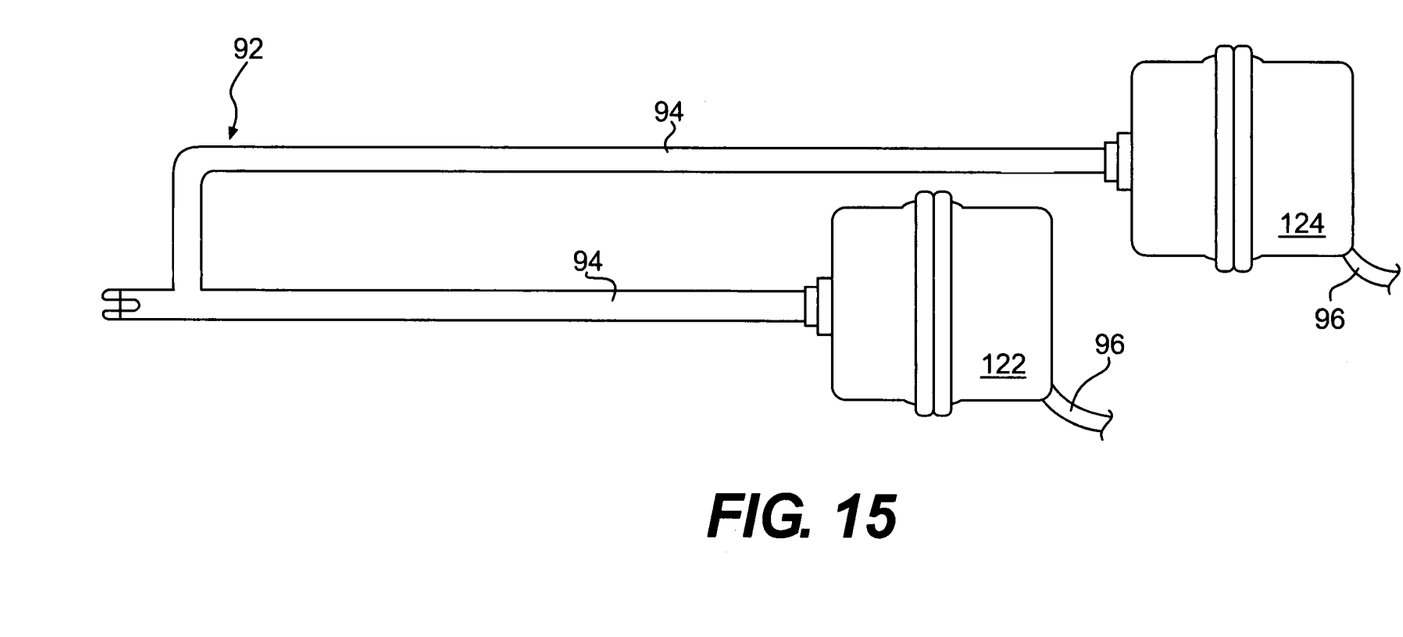
FIG. 15 is a diagrammatic illustration of an alternative valve actuator for use with the engine valve actuation system of FIG. 2.

FIG. 15 illustrates an alternative embodiment of actuating device 80. Actuating device 80 of FIG. 15 may be an assembly of components configured to engage rotation lever arm 88 to cause movement of cam follower 70 between at least three different positions. In particular, actuating device 80 may include a first actuator 124 and a second actuator 126, both connected to rotate lever arm 88 by way of linkage system 92.

Similar to actuator 90, each of first and second actuators 124, 126 may be pneumatically operated to initiate movement of valve element 52 via linkage system 92. Specifically, each of first and second actuators 124, 126 may include a spring-biased piston member (not shown) disposed within a pressure chamber and fixedly connected to piston rod 94. Pressurized air directed into the pressure chambers via inlets 96 may urge the spring-biased piston members from a first position away from the pressure chamber to a second position. Conversely, allowing the pressurized air to drain from the pressure chambers may return the spring-biased piston members to the first position. As piston rods 94 translate between the first and second positions, connected linkage member 98 (referring to FIG. 6) may pivot about pivot point 100. The pivoting of linkage member 98 may result in a translating motion of connected linkage member 102. As described above, a translation of linkage member 102 may result in a rotation of lever arm 88 and connected valve element 52.

The translation distance of first actuator 124 may be different than the translation distance of second actuator 126. That is, in response to air entering the pressure chamber of first actuator 124 via inlet 96, piston rod 94 of first actuator 124 may translate a greater or lesser distance than that distance traveled by piston rod 94 associated with second actuator 126 under the same air pressure. In this manner, a translation of piston rod 94 associated with first actuator 124 from the first to the second positions may result in a first angular rotation of lever arm 88, while a translation of piston rod 94 associated with second actuator 126 from the first to the second positions may result in a second angular rotation of lever arm 88 that is different from the first. These differing angular rotations may facilitate a greater or lesser amount of lift of valve element 52 when coupled with the embodiments of FIGS. 9-14. It is also contemplated that the pressure and/or flow rate of the air supplied to first and/or second actuators 124, 126 may be regulated to vary the distance that each associated piston rod 94 may translate and the speed thereof.

INDUSTRIAL APPLICABILITY

The disclosed valve actuation system may be applicable to any power system where improved fuel efficiency, exhaust emissions, power output, and/or engine braking is desired. In particular, the disclosed system may improve fuel efficiency, exhaust emissions, power output, and/or engine braking by facilitating multiple selectively variable valve events within a single engine cycle. The operation of power system 5 will now be explained.

Atmospheric air may be drawn into air induction system 10 by compressors 20 via induction valve 18, where it may be pressurized to a predetermined level before entering combustion chambers 42 of power source 12. Fuel may be mixed with the pressurized air before or after entering combustion chambers 42. This fuel-air mixture may then be combusted by power source 12 to produce mechanical work and an exhaust flow containing gaseous compounds and solid particulate matter. The exhaust flow may be directed from power source 12 to turbines 26 where the expansion of hot exhaust gasses may cause turbines 26 to rotate, thereby rotating connected compressors 20 and compressing the inlet air. After exiting turbines 26, the exhaust gas flow may be directed to the atmosphere.

The combustion of fuel and air within power source 12 may cause a rotation of cam assembly 62. Cam assembly 62 may act through cam follower 70 and rocker arm 58 to move valve element 52 away from seat 54, thereby initiating a valve event such as the one depicted by second curve 108 of FIG. 7. The initiation of a conventional valve event may coincide with the downward movement of piston 38 to draw air and fuel into combustion chamber 42. As cam assembly 62 continues to rotate, valve spring 60 may act to return valve element 52 to the flow blocking position, thereby ending the valve event. The end of the conventional valve event may be timed to coincide with the movement of piston 38 to the bottom-dead-center position at the end of the intake stroke. Similarly, the exhaust valve (not shown) may be moved to allow piston 38 to push exhaust gas out of combustion chamber 42 during a conventional exhaust stroke of piston 38 from bottom-dead-center to top-dead-center.

A non-conventional valve event may be possible through the rotation of cam follower 70. That is, if a non-conventional valve event such as, for example, an internal exhaust gas recirculation event, is desired, actuator 90 may translate to rotate cam follower 70 through approximately 90 degrees and thereby cause the engagement of secondary tappet protrusion 84 with secondary cam lobes 78. In this situation, a portion of the exhaust gases pushed by piston 38 from combustion chamber 42 may enter air induction system 10 for subsequent combustion. The time at which actuator 90 rotates cam follower 70 may correspond with an initiation timing of the exhaust gas recirculation event, while the angle to which cam follower 70 is rotated may correspond with a valve lift height.

Several advantages are associated with the disclosed variable valve actuation system. In particular, because cam follower 70 may be rotated at any time during the movement of piston 38 and because the rotation angle of cam follower 70 may be related to the lift height of valve element 52 during non-conventional valve event, numerous different valve events may be possible, including variable start and end timing, variable valve lift, valve lift profile, and other similar events that may be initiated and/or changed in response to one or more sensed parameters. Further, because cam follower 70 may be just as applicable to an exhaust valve, engine braking may be possible with the disclosed valve actuation system. Finally, because both an intake valve and an exhaust valve may be movable with the same actuator, the cost of the power system employing the disclosed valve actuation system may be low.

It will be apparent to those skilled in the art that various modifications and variations can be made to the disclosed variable valve actuation system. Other embodiments will be apparent to those skilled in the art from consideration of the specification and practice of the disclosed variable valve actuation system. It is intended that the specification and examples be considered as exemplary only, with a true scope being indicated by the following claims and their equivalents.

What is claimed is:

1. A valve actuation system, comprising:
an engine valve moveable to selectively prevent or allow a flow of fluid relative to the engine valve;
a cam assembly having a first cam lobe and a second cam lobe;
a cam follower having a first tappet protrusion and a second tappet protrusion concentrically aligned, wherein a selective rotation of the cam follower engages either the first tappet protrusion with the first cam lobe to move the engine valve through a first valve event, or the second tappet protrusion with the second cam lobe to move the engine valve through a second valve event; and
a rocker arm disposed between the engine valve and the cam follower.

2. The valve actuation system of claim 1, wherein the second tappet protrusion extends a greater distance from the cam follower than the first tappet protrusion.

3. The valve actuation system of claim 1, wherein the second tappet protrusion annularly surrounds the first tappet protrusion.

4. The valve actuation system of claim 1, wherein the cam follower directly contacts the engine valve.

5. The valve actuation system of claim 1, wherein the second tappet protrusion is rotatable separate from the first tappet protrusion.

6. The valve actuation system of claim 5, further including an actuator configured to rotate the cam follower.

7. The valve actuation system of claim 6, wherein the actuator is a linear actuator.

8. The valve actuation system of claim 7, further including a lever arm fixedly connected to the first tappet protrusion and operatively connected to the actuator.

9. The valve actuation system of claim 6, further including a second actuator configured to rotate the cam follower, wherein the first actuator is configured to rotate the cam follower a first angle and the second actuator is configured to rotate the cam follower a second angle different from the first.

10. The valve actuation system of claim 9, wherein the difference between the first and second angles corresponds with a difference in valve lift.

11. The valve actuation system of claim 5, wherein the first tappet protrusion is threadingly connected to the second tappet protrusion such that a rotation of the second tappet protrusion results in an axial translation of the second tappet protrusion relative to the first.

12. The valve actuation system of claim 11, further including a locking arm preventing rotation of the first tappet protrusion.

13. The valve actuation system of claim 11, wherein the second tappet protrusion includes external gear teeth configured to engage at least one of a worm gear mechanism and a rack mechanism to induce the rotation of the second tappet protrusion relative to the first tappet protrusion.

14. The valve actuation system of claim 1, wherein the engine valve is an intake valve and the second tappet protrusion is configured to open the intake valve during a portion of an exhaust stroke.

15. A method of actuating an engine valve comprising:
rotating a cam assembly having a first cam lobe and a second cam lobe;
rotating a cam follower to selectively engage either a first tappet protrusion with the first cam lobe to move the engine valve through a first valve event, or a second tappet protrusion with the second cam lobe to move the engine valve through a second valve event, where the first tappet protrusion and second tappet protrusion are concentrically aligned; and
rotating a rocker arm to move the engine valve through each event, where the rocker arm is disposed between the engine valve and the cam follower.

16. The method of claim 15, wherein rotating includes rotating the second tappet protrusion relative to the first tappet protrusion.

17. The method of claim 16, further including preventing the first tappet protrusion from rotating.

18. The method of claim 15, further including activating a first linear actuator to initiate a first rotation of the cam follower.

19. The method of claim 18, further including activating a second linear actuator to initiate a second rotation of the cam follower different from the first rotation.

20. The method of claim 19, wherein the first rotation results in a first lift of the engine valve and the second rotation results in a second lift of the engine valve different than the first lift.

21. The method of claim 15, wherein rotating the cam follower results in an axial translation of the second tappet protrusion.

22. The method of claim 15, wherein the engine valve is an intake valve and the second valve event is an opening of the intake valve during an exhaust stroke.

23. A power system, comprising:
- a power source having a combustion chamber and being configured to produce a power output;
- an air induction system configured to direct intake air into the combustion chamber;
- an exhaust system configured to direct exhaust gas from the combustion chamber to the atmosphere;
- an intake valve moveable to selectively prevent or allow a flow of air relative to the engine valve;
- a cam assembly having a primary cam lobe and a secondary cam lobe;
- a cam follower having a first tappet protrusion and a second tappet protrusion concentrically aligned, wherein a selective rotation of the cam follower engages either the first tappet protrusion with the primary cam lobe to move the engine valve through a first valve event, or the second tappet protrusion with the second cam lobe to move the engine valve through an exhaust gas recirculation valve event; and
- a rocker arm disposed between the engine valve and the cam follower.

24. The power system of claim 23, wherein the second tappet protrusion annularly surrounds the first tappet protrusion.

25. The power system of claim 23, wherein the cam follower directly contacts the engine valve.

26. The power system of claim 23, wherein the second tappet protrusion is rotatable separate from the first tappet protrusion.

27. The power system of claim 26, further including a linear actuator configured to rotate the cam follower.

28. The power system of claim 27, further including a second linear actuator configured to rotate the cam follower, wherein the first linear actuator is configured to rotate the cam follower a first angle, and the second linear actuator is configured to rotate the cam follower a second angle different from the first, wherein the difference between the first and second angles corresponds with a difference in valve lift.

29. The power system of claim 28, wherein the first tappet protrusion is threadingly connected to the second tappet protrusion such that a rotation of the second tappet protrusion results in an axial translation of the second tappet protrusion relative to the first.

30. The power system of claim 29, wherein the second tappet protrusion includes external gear teeth configured to engage at least one of a worm gear mechanism and a rack mechanism to induce the rotation of the second tappet protrusion relative to the first tappet protrusion.

31. The power system of claim 23, wherein the second tappet protrusion is configured to open the intake valve during a portion of an exhaust stroke to push exhaust gases into the air induction system.

* * * * *